United States Patent
Toyama (10) Patent No.: US 6,888,684 B2
(45) Date of Patent: May 3, 2005

(54) HIGH-POWER, FOUR GROUP ZOOM LENS

(75) Inventor: Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/778,230

(22) Filed: Feb. 17, 2004

(65) Prior Publication Data

US 2004/0169933 A1 Sep. 2, 2004

(30) Foreign Application Priority Data

Feb. 28, 2003 (JP) .................................... 2003-053454

(51) Int. Cl.[7] .............................................. G02B 15/14
(52) U.S. Cl. .................. 359/687; 359/683; 359/686; 359/772; 359/774; 359/775
(58) Field of Search ....................... 359/683, 686–688, 359/772, 774, 775

(56) References Cited

U.S. PATENT DOCUMENTS

| | | | | | |
|---|---|---|---|---|---|
| 4,576,445 A | * | 3/1986 | Inadome | ...................... | 359/688 |
| 4,634,237 A | * | 1/1987 | Aono et al. | .................. | 359/688 |
| 5,056,900 A | * | 10/1991 | Mukaiya et al. | ............ | 359/676 |
| 5,706,138 A | * | 1/1998 | Abe et al. | .................... | 359/688 |
| 5,721,641 A | * | 2/1998 | Aoki | ........................... | 359/557 |
| 5,760,969 A | * | 6/1998 | Suzuki | ....................... | 359/688 |
| 5,786,943 A | * | 7/1998 | Abe et al. | .................... | 359/688 |
| 5,889,619 A | * | 3/1999 | Ozaki et al. | ................. | 359/688 |
| 6,490,096 B2 | * | 12/2002 | Miyano | ....................... | 359/684 |

FOREIGN PATENT DOCUMENTS

JP        2001-228396        8/2001

* cited by examiner

*Primary Examiner*—Evelyn A. Lester
(74) *Attorney, Agent, or Firm*—Arnold International; Jon W. Henry; Bruce Y. Arnold (57) ABSTRACT

A high-power, four-group zoom lens is disclosed which is formed of only four lens groups, in order from the object side, a first lens group of positive refractive power, a second lens group of negative refractive power, and third lens group of negative refractive power, and a fourth lens groups of positive refractive power. The fourth lens group includes, in order from the object side, a front lens subgroup and a rear lens subgroup. The rear lens subgroup includes, in order from the object side, a lens component of positive refractive power that includes a lens element, a pair of lens elements that may form a doublet component that includes a lens element of positive refractive power, a doublet component, and a lens component of positive refractive power. Specified conditions are satisfied to minimize lateral color and curvature of field.

20 Claims, 4 Drawing Sheets

Spherical Aberration
Fig. 4A

Astigmatism
Fig. 4B

Distortion
Fig. 4C

Lateral Color
Fig. 4D

Spherical Aberration
Fig. 4E

Astigmatism
Fig. 4F

Distortion
Fig. 4G

Lateral Color
Fig. 4H

HIGH-POWER, FOUR GROUP ZOOM LENS

BACKGROUND OF THE INVENTION

Recently, high-power, four-group zoom lenses with high zoom ratios have been increasingly used in handheld TV cameras. Generally, a zoom lens used in an image pickup camera for TV broadcasting requires high performance over the entire range of zoom and over the entire image plane, as well as satisfying certain conditions associated with the use of a solid state image pickup device, such as a CCD. Additionally, there is increasing demand for wide field angles at the wide-angle end along with the high zoom ratio.

As an example, Japanese Laid-Open Patent Application 2001-228396 discloses a high-power zoom lens that responds to the above requirements. This four-group zoom lens includes a focusing lens group, a variator, a compensator, and a relay lens group. The relay lens group, which is the fourth lens group from the object side, includes a front lens subgroup and a rear lens subgroup. The rear lens subgroup is formed of six lens elements, in order from the object side, a first lens element having positive refractive power, second and third lens elements, a fourth lens element that is cemented to a fifth lens element, and a sixth lens element having positive refractive power. The zoom lens described in Japanese Laid-Open Patent Application 2001-228396 uses a large number of lens surfaces in order to provide a high degree of freedom in the design of the zoom lens, achieving a compact design and an achromatic zoom lens by combining lenses with positive and negative refractive powers and different dispersive powers.

In zoom lenses, if a high zoom ratio is to be achieved at a large aperture ratio, it becomes extremely difficult to obtain high optical performance throughout the full range of zoom and the full range of focus. In particular, the refractive power, lens construction and chromatic properties of the lens groups must be properly and strictly prescribed in order to achieve high optical performance without increasing the size or weight of the lens system too much, that is, without excessively increasing the spacings between the lens groups or the number of lens elements.

Currently, there is a desire for optical performance corresponding to high definition broadcast modes. In particular, aberrations at the telephoto end of zooming and aberration variations caused by focusing must be inhibited. If the variation of lateral color or the absolute value of lateral color is not positively inhibited, it is difficult to obtain high resolution.

In the zoom lenses of Japanese Laid-Open Patent Application 2001-228396, a lower refractive power is established and a greater Abbe number is established for the positive lens elements in the second lens component and the third lens component of the rear lens subgroup of the fourth lens group, but it is possible to further reduce lateral color and curvature of field effectively by further adjusting the refractive power and the Abbe number of the positive lens elements. Additionally, in the zoom lenses of the above-mentioned Japanese application, lower refractive power of the first lens element of the rear lens subgroup is also established, but it is possible to further reduce lateral color and curvature of field effectively by further adjusting the refractive power of the first lens element of the rear lens subgroup.

BRIEF SUMMARY OF THE INVENTION

The present invention relates to a high-power, four-group zoom lens that favorably corrects imaging aberrations when focusing from infinity to a near point over a large range of zoom while maintaining a high resolution, high contrast optical performance. The present invention is suitable for use in a handheld television camera.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
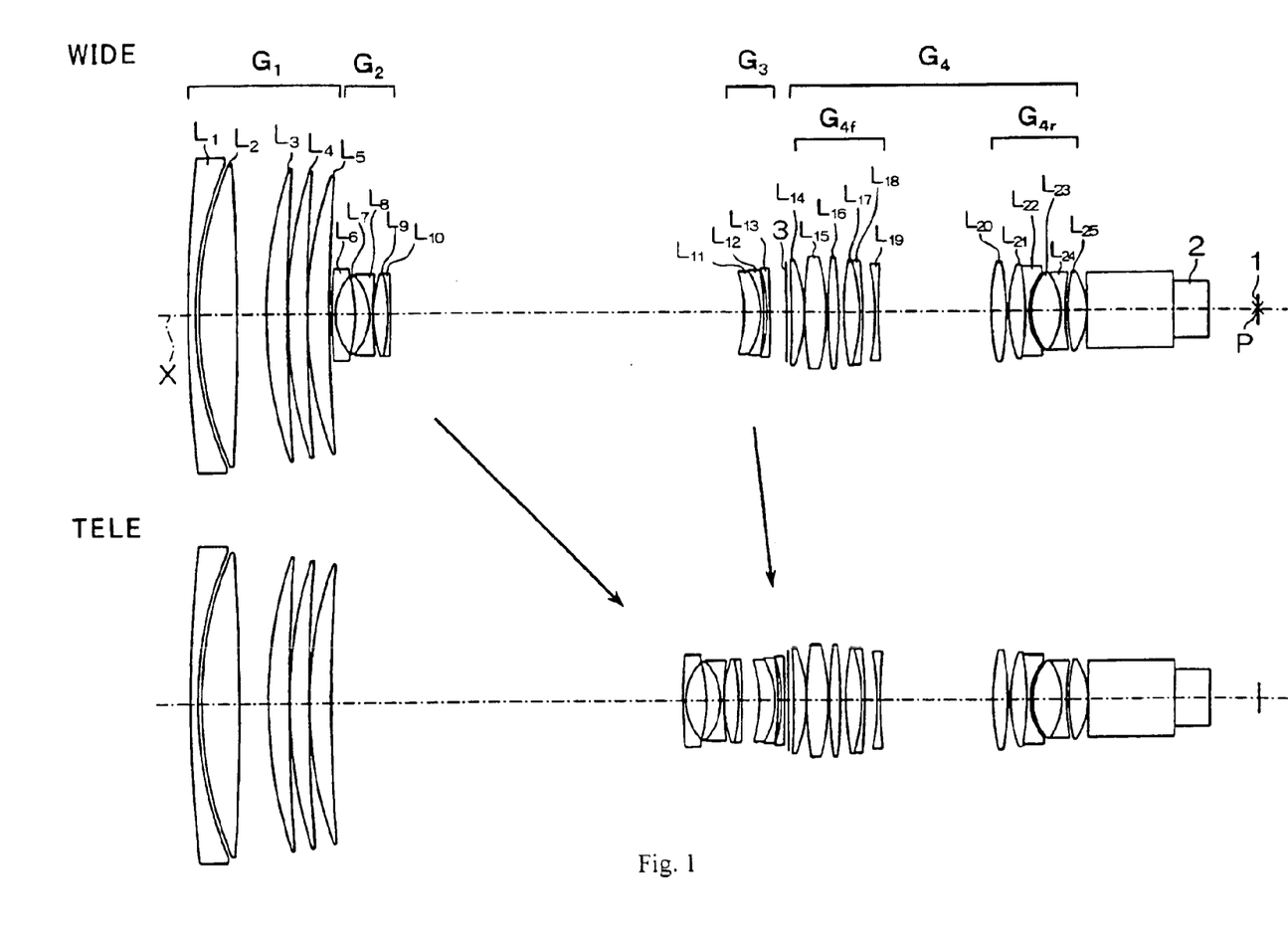
FIG. 1 shows cross-sectional views of Embodiment 1 of the present invention at the wide-angle end (WIDE) and at the telephoto end (TELE)
Figure 2:
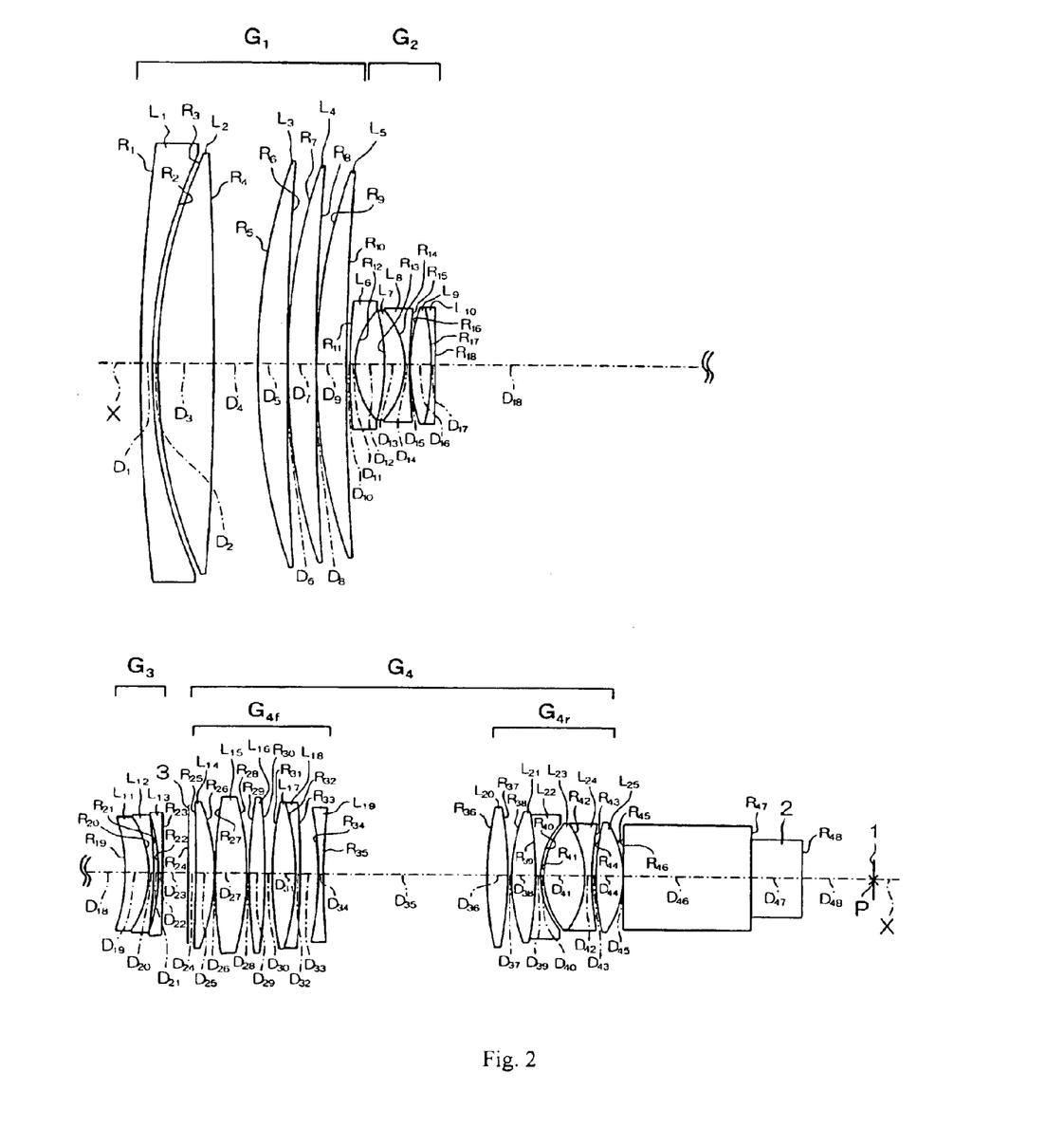
FIG. 2 shows a detailed cross-sectional view of Embodiment 1 of the zoom lens of the present invention at the wide-angle end.

A general description of the preferred embodiments of the zoom lens of the present invention will now be described with reference to FIGS. 1 and 2 that show Embodiment 1. FIG. 1 shows cross-sectional views of Embodiment 1 of the present invention at the wide-angle end (WIDE) and at the telephoto end (TELE). Arrows between the two illustrated zoom settings indicate the general direction of movement of the lens groups $G_2$ and $G_3$ during zooming. Lens groups $G_1$ and $G_4$ remain stationary during zooming. FIG. 2 shows a detailed cross-sectional view of Embodiment 1 of the zoom lens of the present invention at the wide-angle end. In FIGS. 1 and 2, lens groups are referenced by the letter G with a subscript denoting their order from the object side of the zoom lens, from $G_1$ to $G_4$, and with lens group $G_4$ being further divided into, in order from the object side, a front lens subgroup $G_{4f}$ and a rear lens subgroup $G_{4r}$. In FIGS. 1 and 2, lens elements are referenced by the letter L with a subscript denoting their order from the object side of the zoom lens, from $L_1$ to $L_{25}$. Similarly, in FIG. 2, the radii of curvature of the optical surfaces of all the optical elements, including the surfaces of a color separating optical system 2, such as a prism system, are referenced by the letter R with a subscript denoting their order from the object side of the zoom lens, from $R_1$ to $R_{48}$. The on-axis surface spacings along the optical axis X of all the optical element surfaces are referenced by the letter D with a subscript denoting their order from the object side of the zoom lens, from $D_1$ to $D_{48}$.

The definitions of the terms "lens element," "lens component," "lens group," and "lens subgroup" that relate to the descriptions above and the following detailed description are as follows. The term "lens element" is herein defined as a single transparent mass of refractive material having two opposed refractive surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified. At intermediate stages of evaluation, a lens group may be divided into smaller organizations of lens components that may be identified as "lens subgroups" of a particular lens group.

Embodiments 1 and 2 of the present inventions will now be individually described with further reference to the drawings. In the following descriptions, references will be frequently made to a "lens element." However, as set forth above, it is understood that numerous of the lens elements described below are also lens components and may be replaced by lens components that include more than one lens element.

Embodiment 1

As shown in FIG. 1 and FIG. 2, the zoom lens of Embodiment 1 includes, in order from the object side, a first lens group $G_1$ having positive refractive power that is fixed during zooming, a second lens group $G_2$ having negative refractive power that moves during zooming, a third lens group $G_3$ having negative refractive power that moves during zooming in order to correct the variation in the location of the image plane along the optical axis X that otherwise accompanies zooming, and a fourth lens group $G_4$ having positive refractive power that is fixed during zooming. The focal length of the zoom lens is changed by moving the second lens group $G_2$ and the third lens group $G_3$ in the direction of the optical axis X, as shown by the arrows in FIG. 1.

The first lens group $G_1$ includes five lens elements, $L_1$–$L_5$. The second lens group $G_2$ includes five lens elements, $L_6$–$L_{10}$. The third lens group $G_3$ includes three lens elements, $L_{11}$–$L_{13}$. The fourth lens group $G_4$ includes the front lens subgroup $G_{4f}$ that includes six lens elements, $L_{14}$–$L_{19}$, and the rear lens subgroup $G_{4r}$ that includes six lens elements, $L_{20}$–$L_{25}$.

Among lens groups $G_1$–$G_4$, the high-power, four-group zoom lens of the present invention uses a rear lens subgroup $G_{4r}$ of the fourth lens group $G_4$ with a particular construction. Namely, the rear lens subgroup $G_{4r}$ includes, in order from the object side, a biconvex first lens element $L_{20}$, a second lens element $L_{21}$, and a third lens element $L_{22}$ that are intimately bonded with each other, a fourth lens element $L_{23}$ and a fifth lens element $L_{24}$ that are intimately bonded to each other, and a biconvex sixth lens element $L_{25}$. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together, the latter being commonly referred to as a "cemented" lens element arrangement.

The lens element $L_{21}$, which is the second lens element from the object side of the rear lens subgroup $G_{4r}$, is a biconvex lens element. Also, the lens element $L_{22}$ is a biconcave lens element, the lens element $L_{23}$ is a biconvex lens element, and the lens element $L_{24}$ is a biconcave lens element.

An image pickup device, such as a solid state image pickup device, is arranged at an image plane 1 that includes an on-axis image position P. A diaphragm stop 3 that operates as an aperture stop is arranged between the third lens group $G_3$ and the fourth lens group $G_4$. A color separation prism 2 is arranged on the image side of the fourth lens group $G_4$ so that a beam incident from the object side along the optical axis X is separated into three colors by the color separation prism 2 and is then imaged at the image position P on image plane 1.

Preferably, the high-power, four-group zoom lens satisfies the following conditions:

$N_{G4r23P} > 1.7$  Condition (1)

$\nu_{G4r23P} < 30$  Condition (2)

$N_{G4r1} > 1.7$  Condition (3)

where $N_{G4r23P}$ is the refractive index at the e-line (546.1 nm) of a lens element having positive refractive power of the first two lens elements on the image side of the object-side lens component of the rear lens subgroup of the fourth lens group;

$\nu_{G4r23P}$ is the Abbe number at the d-line (587.6 nm) of a lens element having positive refractive power of the first two lens elements on the image side of the object-side lens component of the rear lens subgroup of the fourth lens group; and $N_{G4r1}$ is the refractive index at the e-line (546.1 nm) of the first lens element from the object side of the rear lens subgroup of the fourth lens group.

In Embodiment 1, $N_{G4r23P}$ is the refractive index of lens element $L_{21}$; $\nu_{G4r23P}$ is the Abbe number of lens element $L_{21}$; and $N_{G4r1}$ is the refractive index of lens element $L_{20}$.

Satisfying Conditions (1)–(3) helps minimize lateral color and curvature of field of the zoom lens.

Table 1 below lists the surface number #, in order from the object side, the radius of curvature R (in mm) of each surface, the on-axis surface spacing D (in mm), as well as the refractive index $N_e$ (at the e-line of 546.1 nm) and the Abbe number $\nu_d$ (at the d-line of 587.6 nm) of each lens element for Embodiment 1.

TABLE 1

| # | R | D | $N_e$ | $v_d$ |
|---|---|---|---|---|
| 1 | 466.154 | 3.000 | 1.80922 | 39.6 |
| 2 | 142.349 | 1.423 | | |
| 3 | 143.037 | 14.101 | 1.43497 | 95.1 |
| 4 | −1016.951 | 11.143 | | |
| 5 | 170.767 | 7.718 | 1.43986 | 95.0 |
| 6 | 708.044 | 0.120 | | |
| 7 | 167.220 | 7.393 | 1.43986 | 95.0 |
| 8 | 632.765 | 0.120 | | |
| 9 | 152.137 | 7.876 | 1.49846 | 81.5 |
| 10 | 622.585 | D10 (variable) | | |
| 11 | 192.828 | 1.200 | 1.88814 | 40.8 |
| 12 | 21.008 | 7.515 | | |
| 13 | −57.711 | 5.418 | 1.81643 | 22.8 |
| 14 | −21.209 | 1.175 | 1.80810 | 46.6 |
| 15 | 121.398 | 0.120 | | |
| 16 | 44.370 | 5.610 | 1.71414 | 38.9 |
| 17 | −69.466 | 1.172 | 1.88814 | 40.8 |
| 18 | −461.940 | D18 (variable) | | |
| 19 | −48.646 | 5.976 | 1.85495 | 23.9 |
| 20 | −28.560 | 1.200 | 1.73234 | 54.7 |
| 21 | −109.336 | 1.318 | | |
| 22 | −51.138 | 1.200 | 1.73234 | 54.7 |
| 23 | −444.387 | D23 (variable) | | |
| 24 | ∞ (stop) | 2.071 | | |
| 25 | −350.676 | 4.577 | 1.54611 | 73.2 |
| 26 | −53.310 | 0.120 | | |
| 27 | 131.350 | 8.171 | 1.43497 | 95.1 |
| 28 | −77.034 | 0.656 | | |
| 29 | 148.387 | 4.042 | 1.70346 | 56.5 |
| 30 | −162.732 | 1.996 | | |
| 31 | 100.768 | 5.968 | 1.49846 | 81.5 |
| 32 | −66.130 | 1.270 | 1.81265 | 25.4 |
| 33 | −200.878 | 4.825 | | |
| 34 | −86.068 | 1.200 | 1.88814 | 40.8 |
| 35 | 175.420 | 42.559 | | |
| 36 | 85.523 | 5.420 | 1.75296 | 53.0 |
| 37 | −97.411 | 0.961 | | |
| 38 | 50.073 | 6.290 | 1.88985 | 21.0 |
| 39 | −92.957 | 1.200 | 1.86763 | 33.3 |
| 40 | 21.785 | 1.000 | | |
| 41 | 22.040 | 10.666 | 1.45145 | 74.1 |
| 42 | −24.909 | 1.718 | 1.88599 | 34.8 |
| 43 | 83.628 | 1.106 | | |
| 44 | 65.925 | 7.040 | 1.45167 | 64.4 |
| 45 | −27.708 | 0.000 | | |
| 46 | ∞ | 33.000 | 1.61170 | 46.5 |
| 47 | ∞ | 13.200 | 1.51825 | 64.1 |
| 48 | ∞ | | | |

In the zoom lens of Embodiment 1, the second lens group $G_2$ and the third lens group $G_3$ move during zooming. Therefore, the values of the on-axis spacings $D_{10}$, $D_{18}$, and $D_{23}$ between the lens groups change with zooming. Table 2 below lists the values of the variables $D_{10}$, $D_{18}$, and $D_{23}$ (i.e, the group spacings) at the wide-angle end (f=9.85 mm) and at the telephoto end (f=398.98) at the e-line (546.1 nm) for Embodiment 1.

TABLE 2

| f | $D_{10}$ | $D_{18}$ | $D_{23}$ |
|---|---|---|---|
| 9.85 | 0.999 | 133.098 | 6.268 |
| 398.98 | 132.433 | 6.624 | 1.308 |

From Table 2 it is clear that the zoom ratio (defined as the ratio of the focal length at the telephoto end divided by the focal length at the wide-angle end of the range of zoom) is greater than thirty-five for Embodiment 1.

The zoom lens of Embodiment 1 of the present invention satisfies Conditions (1)–(3) above as set forth in Table 3 below.

TABLE 3

| Condition No. | Condition | Value |
|---|---|---|
| (1) | $N_{G4r23P} > 1.7$ | 1.88985 |
| (2) | $v_{G4r23P} < 30$ | 21.0 |
| (3) | $N_{G4r1} > 1.7$ | 1.75296 |

Figure 3A:
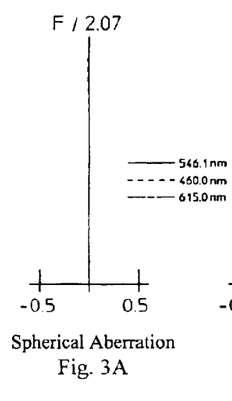
FIGS. 3A–3D show the spherical aberration, astigmatism, distortion, and lateral color, respectively, of the zoom lens according to Embodiment 1 at the wide-angle end.
Figure 3B:
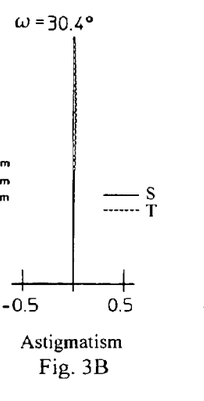
Figure 3C:
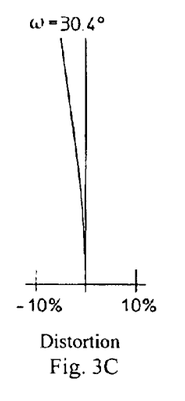
Figure 3D:
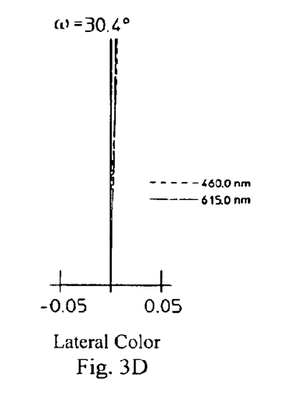
Figure 3E:
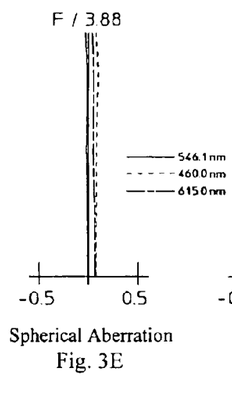
FIGS. 3E–3H show the spherical aberration, astigmatism, distortion, and lateral color, respectively, of the zoom lens according to Embodiment 1 at the telephoto end.
Figure 3F:
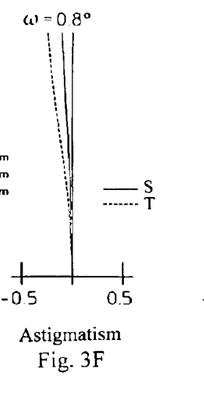
Figure 3G:
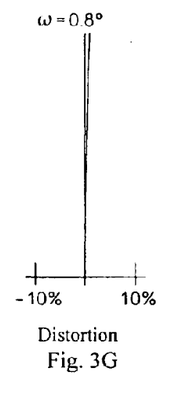
Figure 3H:
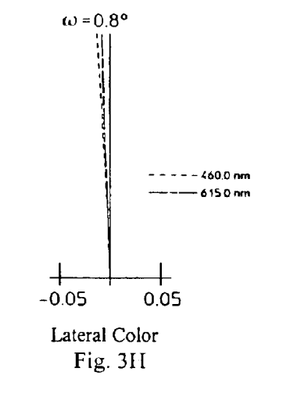

FIGS. 3A–3D show the spherical aberration, astigmatism, distortion, and lateral color, respectively, of the zoom lens of Embodiment 1 at the wide-angle end with an f-number of 2.07. FIGS. 3E–3H show the spherical aberration, astigmatism, distortion, and lateral color, respectively, of the zoom lens of Embodiment 1 at the telephoto end with an f-number of 3.88. In FIGS. 3A and 3E, the spherical aberration is shown for the wavelengths 546.1 nm, 460.0 nm, and 615.0 nm. In the remaining figures, ω is the half-field (of view) angle. In FIGS. 3B and 3F, the astigmatism is shown for the sagittal image surface S and the tangential image surface T. In FIGS. 3C and 3G, distortion is measured at 587.6 nm. In FIGS. 3D and 3H, the lateral color is shown for the wavelengths 460.0 nm and 615.0 nm relative to 587.6 nm. As is apparent from these figures, the various aberrations are favorably corrected over the entire range of zoom.

Embodiment 2

Embodiment 2 is very similar to Embodiment 1 and therefore only the differences between Embodiment 2 and Embodiment 1 will be explained. In Embodiment 1, the twelfth lens element $L_{12}$ has negative refractive power and a meniscus shape with its concave lens surface on the object side, but in Embodiment 2, the twelfth lens element $L_{12}$ is a biconcave lens element. Because otherwise the construction of the zoom lens of Embodiment 2 is very similar to the construction of the zoom lens of Embodiment 1, FIGS. 1 and 2 well represent Embodiment 2.

Table 4 below lists the surface number #, in order from the object side, the radius of curvature R (in mm) of each surface, the on-axis surface spacing D (in mm), as well as the refractive index $N_e$ (at the e-line of 546.1 nm) and the Abbe number $v_d$ (at the d-line of 587.6 nm) of each lens element for Embodiment 2.

TABLE 4

| # | R | D | $N_e$ | $v_d$ |
|---|---|---|---|---|
| 1 | 472.498 | 3.000 | 1.80922 | 39.6 |
| 2 | 142.575 | 1.435 | | |
| 3 | 143.361 | 14.243 | 1.43497 | 95.1 |
| 4 | −961.275 | 11.207 | | |
| 5 | 175.877 | 7.531 | 1.43986 | 95.0 |
| 6 | 668.331 | 0.120 | | |
| 7 | 166.361 | 7.347 | 1.43986 | 95.0 |
| 8 | 581.315 | 0.120 | | |
| 9 | 150.409 | 8.325 | 1.49846 | 81.5 |
| 10 | 711.179 | D10 (variable) | | |
| 11 | 190.613 | 1.200 | 1.88814 | 40.8 |
| 12 | 20.778 | 7.535 | | |
| 13 | −57.027 | 5.274 | 1.81643 | 22.8 |
| 14 | −21.511 | 1.000 | 1.80810 | 46.6 |
| 15 | 124.189 | 0.120 | | |
| 16 | 43.994 | 5.205 | 1.72793 | 38.0 |
| 17 | −92.042 | 1.000 | 1.88814 | 40.8 |
| 18 | −921.338 | D18 (variable) | | |
| 19 | −156.952 | 3.830 | 1.85495 | 23.9 |
| 20 | −34.916 | 1.200 | 1.80810 | 46.6 |
| 21 | 777.843 | 3.300 | | |
| 22 | −37.053 | 1.252 | 1.73234 | 54.7 |
| 23 | −205.273 | D23 (variable) | | |

TABLE 4-continued

| # | R | D | $N_e$ | $v_d$ |
|---|---|---|---|---|
| 24 | ∞ (stop) | 2.194 | | |
| 25 | −289.202 | 4.760 | 1.58428 | 67.3 |
| 26 | −49.832 | 0.125 | | |
| 27 | 127.993 | 8.104 | 1.43497 | 95.1 |
| 28 | −72.788 | 0.590 | | |
| 29 | 153.657 | 4.081 | 1.74262 | 53.9 |
| 30 | −145.623 | 1.976 | | |
| 31 | 101.474 | 6.026 | 1.49846 | 81.5 |
| 32 | −63.299 | 1.311 | 1.81265 | 25.4 |
| 33 | −282.932 | 4.921 | | |
| 34 | −88.953 | 1.200 | 1.88814 | 40.8 |
| 35 | 226.005 | 42.504 | | |
| 36 | 79.132 | 5.307 | 1.77463 | 50.2 |
| 37 | −103.785 | 0.870 | | |
| 38 | 48.817 | 6.197 | 1.80754 | 25.0 |
| 39 | −87.275 | 1.203 | 1.85509 | 36.4 |
| 40 | 22.092 | 1.043 | | |
| 41 | 22.495 | 10.748 | 1.45151 | 71.2 |
| 42 | −24.880 | 1.737 | 1.87020 | 38.9 |
| 43 | 86.869 | 1.141 | | |
| 44 | 67.175 | 7.140 | 1.45167 | 64.4 |
| 45 | −28.049 | 0.000 | | |
| 46 | ∞ | 33.000 | 1.61170 | 46.5 |
| 47 | ∞ | 13.200 | 1.51825 | 64.1 |
| 48 | ∞ | | | |

In the zoom lens of Embodiment 2, the second lens group $G_2$ and the third lens group $G_3$ move during zooming. Therefore, the values of the on-axis spacings $D_{10}$, $D_{18}$, and $D_{23}$ between the lens groups change with zooming. Table 5 below lists the values of the variables $D_{10}$, $D_{18}$, and $D_{23}$ (i.e, the group spacings) at the wide-angle end (f=9.85 mm) and at the telephoto end (f=398.91) at the e-line (546.1 nm) for Embodiment 2.

TABLE 5

| f | $D_{10}$ | $D_{18}$ | $D_{23}$ |
|---|---|---|---|
| 9.85 | 1.000 | 132.845 | 5.234 |
| 398.91 | 132.977 | 4.729 | 1.374 |

From Table 5 it is clear that the zoom ratio (defined as the ratio of the focal length at the telephoto end divided by the focal length at the wide-angle end of the range of zoom) is greater than thirty-five for Embodiment 2.

The zoom lens of Embodiment 2 of the present invention satisfies Conditions (1)–(3) above as set forth in Table 6 below.

TABLE 6

| Condition No. | Condition | Value |
|---|---|---|
| (1) | $N_{G4r23P} > 1.7$ | 1.80754 |
| (2) | $v_{G4r23P} < 30$ | 25.0 |
| (3) | $N_{G4r1} > 1.7$ | 1.77463 |

Figures 4A, 4B:
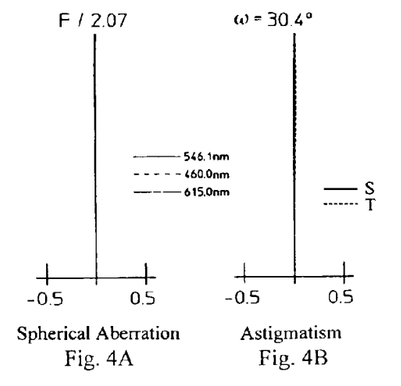
FIGS. 4A–4D show the spherical aberration, astigmatism, distortion, and lateral color, respectively, of the zoom lens according to Embodiment 2 at the wide-angle end.
Figure 4C:
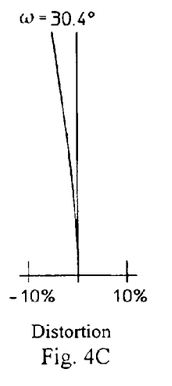
Figure 4D:
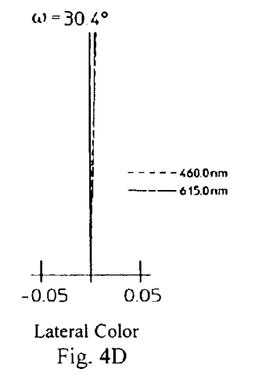
Figures 4E, 4F:
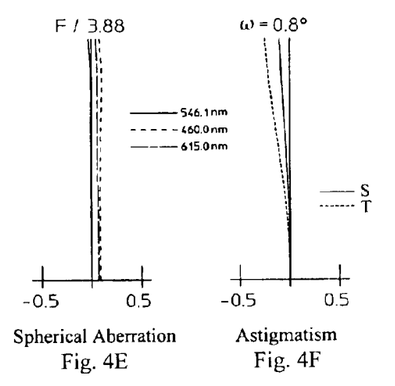
FIGS. 4E–4H show the spherical aberration, astigmatism, distortion, and lateral color, respectively, of the zoom lens according to Embodiment 2 at the telephoto end.
Figure 4G:
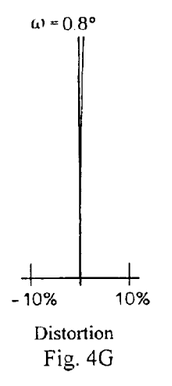
Figure 4H:
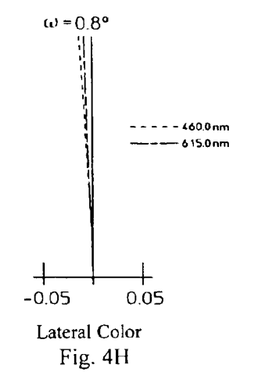

FIGS. 4A–4D show the spherical aberration, astigmatism, distortion, and lateral color, respectively, of the zoom lens of Embodiment 2 at the wide-angle end with an f-number of 2.07. FIGS. 4E–4H show the spherical aberration, astigmatism, distortion, and lateral color, respectively, of the zoom lens of Embodiment 2 at the telephoto end with an f-number of 3.88. In FIGS. 4A and 4E, the spherical aberration is shown for the wavelengths 546.1 nm, 460.0 nm, and 615.0 nm. In the remaining figures, ω is the half-field (of view) angle. In FIGS. 4B and 4F, the astigmatism is shown for the sagittal image surface S and the tangential image surface T. In FIGS. 4C and 4G, distortion is measured at 587.6 nm. In FIGS. 4D and 4H, the lateral color is shown for the wavelengths 460.0 nm and 615.0 nm relative to 587.6 nm. As is apparent from these figures, the various aberrations are favorably corrected over the entire range of zoom.

The present invention is not limited to the aforementioned embodiments, as it will be obvious that various alternative implementations are possible. For instance, values such as the radius of curvature R of each of the lens components, the surface spacings D, the refractive index $N_e$, as well as the Abbe number $v_d$, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only four lens groups, in order from the object side along an optical axis:

a first lens group having positive refractive power;

a second lens group having negative refractive power;

a third lens group; and a fourth lens group having positive refractive power;

wherein the first lens group and the fourth lens group do not move during zooming;

the second lens group and the third lens group are moved along the optical axis during zooming;

the fourth lens group includes, in order from the object side along the optical axis, a front lens subgroup and a rear lens subgroup with the distance along the optical axis between the front lens subgroup and the rear lens subgroup being greater than the distance between any adjacent lens elements of the front lens subgroup or any adjacent lens elements of the rear lens subgroup;

the rear lens subgroup includes, in order from the object side along the optical axis, a first lens component having positive refractive power, a lens element, another lens element, one of said lens elements having positive refractive power, a further lens element and an additional lens element that is intimately bonded to said further lens element, and another lens component having positive refractive power; and the following conditions are satisfied:

$N_1 > 1.7$ $v < 30$ where $N_1$ is the refractive index at the e-line of a lens element having positive refractive power of the first two lens elements on the image side of said first lens component; and $v$ is the Abbe number at the d-line of a lens element having positive refractive power of the first two lens elements on the image side of said first lens component.

2. The zoom lens of claim 1, wherein the following condition is satisfied:

$N_2 > 1.7$ where $N_2$ is the refractive index at the e-line of a lens element having positive refractive power of said first lens component.

3. The zoom lens of claim 2, wherein the third lens group has negative refractive power.

4. The zoom lens of claim 1, wherein the third lens group has negative refractive power.

5. The zoom lens of claim 1, wherein each of said first lens component and said another lens component consists of a lens element.

6. The zoom lens of claim 2, wherein each of said first lens component and said another lens component consists of a lens element.

7. The zoom lens of claim 3, wherein each of said first lens component and said another lens component consists of a lens element.

8. The zoom lens of claim 4, wherein each of said first lens component and said another lens component consists of a lens element.

9. The zoom lens of claim 1, wherein the rear lens subgroup consists of said first lens component, said first two lens elements, said further lens element, said additional lens element, and said another lens component.

10. The zoom lens of claim 9, wherein each of said first lens component and said another lens component consists of a lens element.

11. The zoom lens of claim 2, wherein the rear lens subgroup consists of said first lens component, said first two lens elements, said further lens element, said additional lens element, and said another lens component.

12. The zoom lens of claim 11, wherein each of said first lens component and said another lens component consists of a lens element.

13. The zoom lens of claim 3, wherein the rear lens subgroup consists of said first lens component, said first two lens elements, said further lens element, said additional lens element, and said another lens component.

14. The zoom lens of claim 13, wherein each of said first lens component and said another lens component consists of a lens element.

15. The zoom lens of claim 4, wherein the rear lens subgroup consists of said first lens component, said first two lens elements, said further lens element, said additional lens element, and said another lens component.

16. The zoom lens of claim 15, wherein each of said first lens component and said another lens component consists of a lens element.

17. The zoom lens of claim 1, wherein the zoom lens provides a zoom ratio of greater than thirty-five between the telephoto end and the wide-angle end.

18. The zoom lens of claim 2, wherein the zoom lens provides a zoom ratio of greater than thirty-five between the telephoto end and the wide-angle end.

19. The zoom lens of claim 5, wherein the zoom lens provides a zoom ratio of greater than thirty-five between the telephoto end and the wide-angle end.

20. The zoom lens of claim 6, wherein the zoom lens provides a zoom ratio of greater than thirty-five between the telephoto end and the wide-angle end.

* * * * *

UNITED STATES PATENT AND TRADEMARK OFFICE
CERTIFICATE OF CORRECTION

PATENT NO. : 6,888,684 B2
DATED : May 3, 2005
INVENTOR(S) : Toyama

It is certified that error appears in the above-identified patent and that said Letters Patent is hereby corrected as shown below:

Title page, Item [54] and Column 1, line 1,
Title, change "FOUR GROUP" to -- FOUR-GROUP --;

Column 2,
Line 52, change "from L, to" to -- from $L_1$ to --; and

Column 3,
Line 60, change "from $L_{11}$ - $L_3$" to -- $L_{11}$ to $L_{13}$ --.

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO.   : 6,888,684 B2
DATED        : May 3, 2005
INVENTOR(S)  : Toyama

It is certified that error appears in the above-identified patent and that said Letters Patent is hereby corrected as shown below:

<u>Title page, Item [54] and Column 1, line 1,</u>
Title, change "FOUR GROUP" to -- FOUR-GROUP --;

<u>Column 2,</u>
Line 52, change "from L, to" to -- from $L_1$ to --; and <u>Column 3,</u>
Line 60, change "$L_{11}$ - $L_3$" to -- $L_{11}$ to $L_{13}$ --.

This certificate supersedes Certificate of Correction issued July 19, 2005.

Signed and Sealed this

Thirteenth Day of September, 2005

JON W. DUDAS
*Director of the United States Patent and Trademark Office*